United States Patent
Farkas et al.

(10) Patent No.: US 8,958,316 B2
(45) Date of Patent: Feb. 17, 2015

(54) POWER AWARE SCHEDULING AND POWER CONTROL TECHNIQUES FOR MULTIUSER DETECTION ENABLED WIRELESS MOBILE AD-HOC NETWORKS

(75) Inventors: Joseph Farkas, Merrimack, NH (US); Brandon P. Hombs, Merrimack, NH (US); John A. Tranquilli, Jr., Merrimack, NH (US)

(73) Assignee: Collision Communications, Inc., Peterborough, NH (US)

( * ) Notice: Subject to any disclaimer, the term of this patent is extended or adjusted under 35 U.S.C. 154(b) by 652 days.

(21) Appl. No.: 12/932,318

(22) Filed: Feb. 23, 2011

(65) Prior Publication Data
US 2012/0250595 A1 Oct. 4, 2012

Related U.S. Application Data

(60) Provisional application No. 61/327,912, filed on Apr. 26, 2010.

(51) Int. Cl.
*H04L 12/26* (2006.01)
*H04W 52/24* (2009.01)
*H04W 52/30* (2009.01)
*H04W 52/34* (2009.01)

(52) U.S. Cl.
CPC ............ *H04W 52/241* (2013.01); *H04W 52/30* (2013.01); *H04W 52/34* (2013.01); *Y02B 60/50* (2013.01)
USPC .......................................................... 370/252

(58) Field of Classification Search
None
See application file for complete search history.

(56) References Cited

U.S. PATENT DOCUMENTS

| 7,245,673 | B2 | 7/2007 | MacLeod |
| 8,401,586 | B2* | 3/2013 | Kou et al. ................. 455/522 |
| 2002/0070845 | A1 | 6/2002 | Reisinger et al. |
| 2003/0189906 | A1 | 10/2003 | Belcea |
| 2005/0058151 | A1* | 3/2005 | Yeh .............................. 370/445 |
| 2006/0045046 | A1 | 3/2006 | Kim |
| 2006/0135145 | A1 | 6/2006 | Redi |
| 2006/0159038 | A1 | 7/2006 | Hasty |
| 2006/0215611 | A1* | 9/2006 | Nakagawa et al. .......... 370/332 |

(Continued)

FOREIGN PATENT DOCUMENTS

| JP | 2000-252918 A | 9/2000 |
| WO | 00-71843 A2 | 11/2000 |

OTHER PUBLICATIONS

HSPA and LTE for Mobile Broadband, Dahlman, E., Parkvall, S., Skold, J., and Beming, 3G Evolution, Second Edition, Academic Press 2008.

(Continued)

*Primary Examiner* — Rhonda Murphy

(57) ABSTRACT

What is provided is a system for maintaining acceptable error rates in a MUD-enabled ad-hoc network. In this system the power spread associated with all of the nodes is maintained within the dynamic range of the system, for instance 30 dB. Also, the signal-to-noise ratio at an intended receiver is maintained above a predetermined minimum SNR, for instance above 5 dB. If the dynamic range rule is not met, then the power at the transmitting node is attenuated such that the dynamic range rule is met, checking to see that the minimum SNR rule is also met, or the transmission from this node is pulled. If there is no power control solution, then power aware scheduling is applied. Alternatively, only power aware scheduling is utilized.

21 Claims, 12 Drawing Sheets

(56) References Cited

U.S. PATENT DOCUMENTS

| | | | |
|---|---|---|---|
| 2008/0144493 A1* | 6/2008 | Yeh | 370/230 |
| 2009/0181715 A1* | 7/2009 | Shin et al. | 455/522 |
| 2010/0034107 A1* | 2/2010 | Chin et al. | 370/252 |
| 2011/0051674 A1 | 3/2011 | Niedzwiecki et al. | |
| 2011/0149769 A1* | 6/2011 | Nagaraja | 370/252 |

OTHER PUBLICATIONS

3G Handset and Network Design, Varrall, G.; Belcher R., John Wiley & Sons, Inc. 2003, pp. 74.

"Topology Control of Multihop Wireless Networks Using Transmit Power Adjustment", R. Ramanathan, R. Rosales-Hain, Proc. IEEE INFOCOM, pp. 404-413, 2000.

Singh, S., Woo, M.; Raghavendra, Power-Aware Routing in Mobile Ad-Hoc Networks, C. S. 1998. Proceedings of 4th Annual ACM/IEEE international Conferenceon Mobile Computing and and Networking, Dallas, TX Oct. 25-30, 1998, WP Osborne.

Search Report dated Feb. 8, 2012 corresponding to related PCT application PCT/US11/033358.

JP Office Action dated Nov. 29, 2011 against JP Patent Application No. 2009-098246; translation by Meisei International Patent Firm.

EP Office Action dated Jan. 18, 2011 against (related) EP Patent Application No. 038176798; BAE Systems Information and Electronic Systems Integrations, Inc. (Applicant).

Baines, S.J. et al., "Double window multi-user detection for asynchronous DS-CDMA", IEEE 1996, Electronic Letters, Nov. 21, 1996, vol. 32, No. 24, pp. 2199-2201.

Damnjanovic, A. et al., "Iterative Multiuser Detection/Decoding for Turbo Coded CDMA Systems", IEEE Communications Letters, vol. 5, No. 3, Mar. 2001, pp. 104-106.

Wang, X. et al., "An Overlapping Window Decorrelating Multiuser Detector for DS-CDMA Radio Channels", IEEE Transactions on Communications, vol. 49, No. 8, Aug. 2001, pp. 1488-1495.

International Preliminary Report on Patentability for corresponding PCT patent application No. PCT/US11/033358 filed Apr. 21, 2011; (references previously submitted in IDS filed Apr. 30, 2012).

U.S. Non-Final Office Action mailed Jan. 17, 2013 for related U.S. Appl. No. 13/090,435, filed Apr. 20, 2011.

* cited by examiner

Power Control

Mesh / MANET

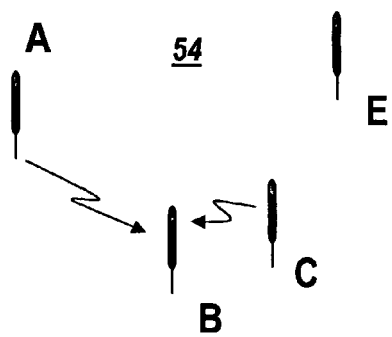

Instantaneous Dynamic Range requirement: 30 dB Max
Max link loss permitted at Max power = 120 dB
Link Loss C→B: 50 dB   Link Loss A→B: 100 dB Stating power levels relative to Max power:
B will receive C at -50 dB
If A transmits at maximum power, B will receive A at -100 dB
For B to receive both signals and properly apply MUD algorithms needs 50 dB inst. dynamic range
Solution: Power Control Attenuated B by at least 20 dB

*Fig. 3*

A pathological situation (PC cannot solve)

Mesh / MANET

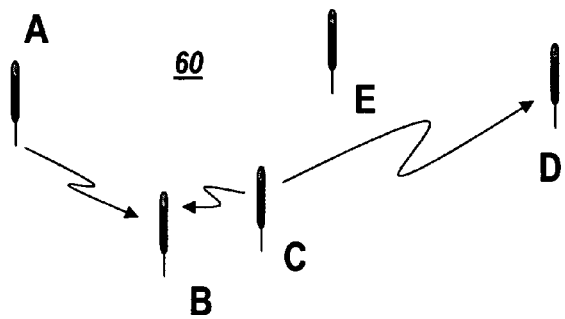

Time Slots, 50

| | | | |
|---|---|---|---|
| Mud Codes, 52 | A→B | - | - |
| | C→D | - | - |
| | - | - | - |

Instantaneous Dynamic Range requirement: 30 dB Max
Max link loss permitted at Max power = 120 dB
Link Loss C→D: 110 dB    Link Loss C→B: 50 dB    Link Loss A→B: 100 dB Stating power levels relative to Max power:
C must transmit at least at -10 dB to close the link with D
B will receive C at -50 dB
If A transmits at maximum power, B will receive A at -100 dB
For B to receive both signals and properly apply MUD algorithms system needs 50 dB inst. dynamic range

Only has 30 dB,        No Power Optimization solution exists

*Fig. 4*

If not PC, can solve with scheduling

Mesh / MANET

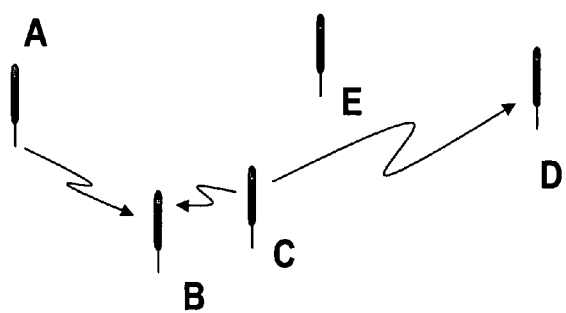

Instantaneous Dynamic Range requirement: 30 dB Max
Max link loss permitted at Max power = 120 dB
Link Loss C→D: 110 dB   Link Loss C→B: 5
0 dB   Link Loss A→B: 100 dB Stating power levels relative to Max power:
A transmits to B at -20 dB and closes link
    No interference from C since not transmitting in that time slot
C transmits at -10 dB and closes link with D
    Problem solved with scheduling

*Fig. 5*

Power Control Problem Formulation

Goal: Formulate MUD receiver constraints as a linear programming problem

MUD receivers typically have two constraints:
- Constraint 1: minimum decodable SINR $\equiv \delta$
  - a.k.a Interference-suppression limit
  - DIMA: -30 dB
- Constraint 2: minimum decodable SNR
  - DIMA: 5 dB $SNR_{ik}$ = received power from user i at user k at 0 dB transmit attenuation $\alpha_i$ = attenuation of user i $\gamma$ = minimum decodable SINR

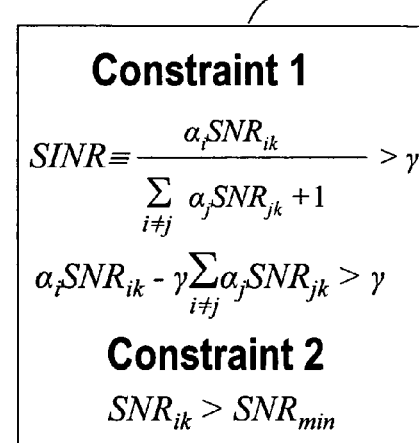

Constraint 1

$$SINR \equiv \frac{\alpha_i SNR_{ik}}{\sum_{i \neq j} \alpha_j SNR_{jk} + 1} > \gamma$$

$$\alpha_i SNR_{ik} - \gamma \sum_{i \neq j} \alpha_j SNR_{jk} > \gamma$$

Constraint 2

$SNR_{ik} > SNR_{min}$

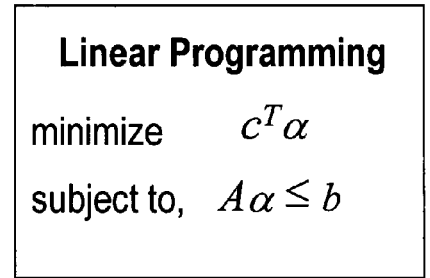

Linear Programming minimize $c^T \alpha$ subject to, $A\alpha \leq b$

Fig. 6

Linear Programming Example $$\text{minimize} \quad [1 \ 1 \ 1][\alpha_4 \ \alpha_5 \ \alpha_6]^T$$

subject to, $$\begin{bmatrix} SNR_{41} & -\gamma SNR_{51} & -\gamma SNR_{61} \\ -\gamma SNR_{42} & SNR_{52} & -\gamma SNR_{62} \\ -\gamma SNR_{43} & -\gamma SNR_{53} & SNR_{63} \\ SNR_{41} & 0 & 0 \\ 0 & SNR_{52} & 0 \\ 0 & 0 & SNR_{63} \end{bmatrix} \begin{bmatrix} \alpha_4 \\ \alpha_5 \\ \alpha_6 \end{bmatrix} \geq \begin{bmatrix} \gamma \\ \gamma \\ \gamma \\ SNR_{min} \\ SNR_{min} \\ SNR_{min} \end{bmatrix}$$

Node Laydown

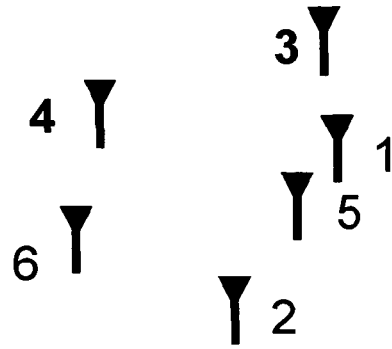

$SNR_{ik}$ = received power from user i at user k $\alpha_i$ = attenuation of user i $\gamma$ = minimum decodable SINR

*Fig. 7*

Power Aware Scheduling

- Power Aware Scheduling
  - Adjust transmission schedule so that all packets are decoded correctly Node Laydown

| | Time Slots, 76 | | |
|---|---|---|---|
| Mud Codes | 4→1 | 4→1 | - |
| | 6→3 | 6→3 | 6→3 |
| | - | - | 5→2 |

Basic Power Aware Scheduling MAC

• Power Aware Scheduling Check is done using QPSK metric. When a packet is about to be transmitted, it is tested against the 16QAM metric to see if it can obtain the higher rate.

• Check before every control slot you transmit on to see if you violate power aware scheduling rules. If you do, move off of the current slot.

POWER AWARE SCHEDULING AND POWER CONTROL TECHNIQUES FOR MULTIUSER DETECTION ENABLED WIRELESS MOBILE AD-HOC NETWORKS

RELATED APPLICATIONS

This Application claims rights under 35 USC §119(e) from U.S. Application Ser. No. 61/327,912 filed Apr. 26, 2010, the contents of which are incorporated herein by reference.

STATEMENT OF GOVERNMENT INTEREST

This invention was made with United States Government support under Contract No. W15P7T-06-C-P423 awarded by the United States Army. The United States Government has certain rights in this invention.

FIELD OF THE INVENTION

This invention relates to communications systems and, more particularly, to multiuser detector enabled ad-hoc networks.

BACKGROUND OF THE INVENTION

Mobile ad-hoc networks are known in which a number of users intercommunicate on a network established when one or more of the users arrive at a scene or given area and the ad-hoc network is set up. These ad-hoc networks have been known to have been used for incident command in emergency management scenarios when a number of mobile units arrive at an incident site at which an ad-hoc network is created. The ad-hoc network is created on the spot when at least one of the mobile units arrives at the incident scene and adds other nodes when additional units arrive within the ad-hoc network coverage area.

From a military point of view, when troops are deployed in a theater and arrive on-scene, it is important to be able to immediately establish an ad-hoc network so that all of the troops can communicate with each other. Unlike the civilian use in which there may be an incident commander, in a military situation it is not desirable to have a single identifiable incident commander. One of the reasons is that by taking out the incident commander, one causes the entire network to fail. Thus, there must be no single central point of failure such as a base station that would create a vulnerability in which the enemy could completely disrupt communications simply by taking out one node.

Moreover, since the military is a highly mobile force, this means that they cannot typically set up fixed infrastructure. Thus, the network must be adaptable enough to handle the node movement in and out of the network coverage area.

While adaptive ad-hoc networks have been utilized in the past, there is a need for multiuser detector capability to handle large numbers of troops. The multiuser detector (MUD) capability permits handling communications on the same frequency and at the same time. Thus, large numbers of units can intercommunicate on a single channel.

It is the main feature of a multiuser detector system that users can communicate on the same frequency at the same time and still have the messages separable so that a message from one user does not interfere with a message from another user.

It will be appreciated that any real implementation of a physical layer for a multiuser detector enabled network will have a finite dynamic range. The dynamic range, aka near/far separation, defines the maximum power spread between multiple users being received without significant error rate. The finite dynamic range of a real system is due to many factors including algorithm implementation in fixed point, analog-to-digital converter quantization, filter effects and channel dynamics such as Doppler and multipath. In general, for ad-hoc systems there is a so-called near/far separation problem in which different signals are coming in with different powers. While in cellular networks having a fixed base station or tower, power control is used to assure that all signals come in at an identical receive power. However, in an ad-hoc system in which there are multiple users there is no ability to vary the power of each of the transceivers such that the receive power at each of the receivers is the same. Thus, it is important to be able to adjust transmit power such that the received signals at any node exist between a maximum receive power and a minimum receive power.

In MUD systems, without power control for instance 90% of the communications nonetheless arrive with acceptable error rates. However, 10% of the time there are significant error rates when the receive power at a node is out of the fixed MUD dynamic range. This means that 10% of the time the system will not work, which is unacceptable. With a multiuser detector, the dynamic range can be expressed as the difference in power between maximum receive power and minimum receive power for all of the nodes.

This finite dynamic range means that there are certain circumstances based on the positions of the users in which the dynamic range is exceeded. There is therefore a need to deal with the finite dynamic range when operating in a mobile ad-hoc network.

While 30 dB is considered to be a relatively large dynamic range, more complex implementations can achieve a 40 or 50 dB dynamic range. However, achieving a greater than 30 dB dynamic range involves systems that are bigger in size, weight and power and result in costly radios.

Power adjustment for the individual transceivers in the mobile ad-hoc network is one way to be able to establish reliable communications between all of the nodes of the network. Most importantly, there must be a minimum signal-to-noise ratio or interference-to-noise ratio that must exist in order that one user at one node can communicate with other nodes. Moreover, the transmission from one node cannot overpower other nodes which would result in interference with the other nodes.

One way of establishing an acceptably low error rate is to make sure that the receive power from each of the transceivers at each of the nodes is such as to provide a received signal with a high signal-to-noise ratio and a high signal to interference plus noise ratio.

It therefore may be desirable to utilize power control in multiuser detector ad-hoc networks, with the goal of a signal arriving at a minimum desired power level or within a power spread. It may also be desirable to use a power related scheduling program to schedule packets at a different time.

While with cellular towers and fixed base stations signals are to arrive at identical powers, when looking at an ad-hoc network for instance having five users trying to send to five different users, the problem of adjusting power is indeed complex. Note that it is actually impossible to have signals from every user arrive at every other user at the same power level due to the different locations of the users. When one adds multiuser detection to the mix it is important that the received signals from all five users are within the finite dynamic range of the system.

By way of further background, Power Control (PC) and Power Aware Scheduling (PAS) are well studied topics in the context of cellular networks as is disclosed in Dahlman, E., Parkvall, S., Skold, J., and Beming, P. 2008 3*G Evolution, Second Edition: HSPA and LTE for Mobile Broadband.* 2. Academic Press. Cellular networks, which operate in hub-and-spoke topologies, use Power Control to minimize the interference from other handsets, with the goal controlling all handset's power to within a couple dB at the base station as is disclosed in Varrall, G. and Belcher, R. 2003 3*G Handset and Network Design.* John Wiley & Sons, Inc. The Power Control requirement is necessary because cellular networks currently use single user receivers which treat interference from other users as noise. Power Control in cellular networks has the added benefit of reducing the overall transmit power level of the handsets, thus saving battery life. Power Aware Scheduling, where the base station makes scheduling decisions based off of received power levels from all handsets, is used in cellular networks to schedule the handset with the best instantaneous channel.

More recently, PC and PAS for Multiple Access Networks (MANETs) has become an increasingly studied topic. PC and PAS in MANETs, similar to cellular networks, have been shown to increase network capacity and maximize battery life as is disclosed in R. Ramanathan and R. Rosales-Hain, "Topology Control of Multihop Wireless Networks Using Transmit Power Adjustment," Proc. IEEE INFOCOM, pp. 404-413, 2000; and Singh, S., Woo, M., and Raghavendra, C. S. 1998. Power-aware routing in mobile ad-hoc networks. In *Proceedings of the 4th Annual ACM/IEEE international Conference on Mobile Computing and Networking* (Dallas, Tex., United States, Oct. 25-30, 1998). W. P. Osborne and D. Moghe, Eds. MobiCom '98. ACM, New York, N.Y., 181-190. DOI=http://doi.acm.org/10.1145/288235.288286

Although MUD based receivers theoretically require no power control, in practice they can only support separate users with a limited power spread, 30 dB in the case of the DARPA Interference Multiple Access (DIMA) system.

Other related references include R. Learned et al. "Interference Multiple Access Wireless Network Demonstration Enabled by Real-Time Multiuser Detection", Proc IEEE RWS, Orlando, Fla., 2008; and Y. Eisenberg, K. Conner, M. Sherman, J. Niedzwiecki, R. Brothers, "MUD Enabled Media Access Control for High Capacity, Low-Latency Spread Spectrum Comms", Proceedings of the IEEE MILCOM, Orlando, Fla., 2007.

SUMMARY OF THE INVENTION

Multiuser Detection (MUD) based receivers theoretically require no power control (PC) as they have the ability to separate signals regardless of their relative power levels as long as these signals achieve a suitable signal-to-noise ratio (SNR). In practice, receiver designs have finite dynamic range. According to this invention, power aware scheduling (PAS) and power control (PC) algorithms are provided to address the finite MUD dynamic range and performance issues.

It is the purpose of the subject system to assure that all transmissions from the nodes arrive error-free and at the minimum power possible by providing robust signal reception and rejecting internode interference. In order to achieve this goal, information about each of the nodes is transmitted around the network so that this information is available at each node. With this information available, with respect to power control, the transceiver at a node either schedules a packet for transmission, attenuates power level to a minimum useable value and schedules the transmission, or does not schedule the transmission. To do so, each of the transmitters uses a power control algorithm every time they transmit and sets their output power accordingly, meaning they set output power attenuation. If there is no power control solution available, the transmission of the packet is rescheduled in a power aware scheduling process to a different time slot.

As a result, interference is reduced, and packet error rates are minimized while at the same time minimizing power by minimizing the overall power spread associated with the nodes on the ad-hoc network.

More particularly, information relating to all of the characteristics of all the nodes is available at all of the other nodes. Before a node can transmit one must first attempt to adjust its output power such that the instantaneous dynamic range or power spread as measured at a transmitting node is not outside the finite MUD dynamic range, in one embodiment 30 dB. The instantaneous dynamic range or power spread in the ad-hoc network is calculated at the transmitting node from the SNR values at all of the nodes, and this calculated instantaneous dynamic range is compared to the MUD's finite dynamic range. If the instantaneous dynamic range or power spread exceeds the MUD's finite dynamic range, then power attenuation is necessary. If no power adjustment solution is possible, the node transmission is not scheduled.

It is a further requirement that the received signal-to-noise ratio at an intended receiver be above some minimum acceptable signal-to-noise level, namely 5 dB.

If the 30 dB, 5 dB rules or constraints are not met, then the transceiver is not permitted to transmit. Failing a power control solution, the power aware scheduling portion of the subject invention is invoked in which an acceptable time slot is found. As will be appreciated, since MUD systems typically operate on TDMA or CDMA networks, there are in fact other time slots available during the occasional instance when simultaneous channel use is not possible.

It is noted that control messages are transmitted in a completely distributive fashion such that all users send out a control message on what they view is everyone's schedule and everyone's received signal-to-noise ratio, with all nodes collecting information relating to received signal-to-noise ratio, calculated dynamic range and scheduling.

Thus, in the simplest embodiments, in order for a MUD-enabled ad-hoc network to implement power control or power aware scheduling, it is important that the nodes transmit to all other nodes, its schedule, and the receive power levels of all received signals in terms of receive signal-to-noise ratios. This can be provided via a control channel in which sampling is done frequently so that the subject algorithms can either provide realtime power control or power aware scheduling.

In the control of the transceiver at a node, a power control and/or power aware scheduler module is utilized to control the associated transceiver, with the power control and/or power aware scheduler utilizing a linear algorithm that implements two rules or constraints. The first rule is that transmissions from the nodes in the ad-hoc network must be within a certain power range or power spread that does not exceed the finite MUD dynamic range, i.e. 30 dB. The second rule is that a node has to provide sufficient transmit power such that its packets are received at the intended receiver above a minimum signal-to-noise ratio, in one case 5 dB.

When both of these rules are met, then packet errors are minimized since the finite MUD dynamic range at the intended receiver will not have been exceeded and the received signal and the intended receiver will be above a minimum SNR.

Note when all rules or constraints are met, then a node is permitted to transmit. If there is no power control solution, meaning that the power for the transmitting node cannot be adjusted so that the instantaneous dynamic range or power spread is within the finite MUD dynamic range or that the signal at the intended receivers is above the minimum SNR, then transmission is not scheduled, i.e. it is inhibited. The reason the transmission is inhibited is because either transmitted packets will not be reliably received if the received power is too low; or the finite dynamic range of the system has been exceeded, causing unacceptable packet error rates. With power appropriately set, interference-free packet reception is assured and at minimum power.

Note, interference-free reception may be achieved without adjusting transmit power at all. This involves the subject power aware scheduling technique in which if the above rules are not met for a given node, then the node will be scheduled to transmit in another slot.

Thus, even in MUD systems where there is no strict adherence to time slotted timing, one can nonetheless trade off different bits of time, when for instance a particular transmission would interfere with another transmission within the ad-hoc network.

For instance, if one is trying to schedule five users to be within 30 dB of each other in one time slot, with four users presently transmitting at the same time, if a fifth user seeks to transmit at the same time, the transmission can result in received packet errors due to poor received SNR; or the transmission might start causing errors in the receipt of packets by other users due to excess dynamic range.

In these situations, one can simply seek to transmit in a different time slot or on a different channel if it turns out that the node seeking to transmit either transmits with an unacceptable error rate or creates unacceptable error rates at other nodes.

In short, if during a check of the status of the network one cannot adjust ones own power to so that the network operates within the dynamic range rule or the minimum SNR rule, one then looks for the next time slot at which packet transmission is acceptable.

It will be appreciated that if multiple users are using the same time slot and if an additional user violates the dynamic range rule in this particular time slot, it does not necessarily mean that this time slot does not get used. The other users if they are within the dynamic range and signal-to-noise ratio rules may operate in this time slot, whereas the new user may simply be moved to a different time slot or channel.

Note while the signal-to-noise ratio metric is used herein, other signal strength metrics may be used including RSSI, or received strength signal indicators.

Another feature of the subject invention is that by measuring the received signal-to-noise ratio at the intended receiver, one can determine if there is excess signal-to-noise ratio. If there is excess signal-to-noise ratio then the transmitting node can send data at a higher rate to enable higher modulations and codings.

Concomitantly, when the signal-to-noise ratio drops, the subject system has the ability to slow down transmission rate to accommodate the dynamically changing situation. The important factor in the variable transmission rate is to establish a transmission rate that will not cause errors at other nodes operating at their basic rate, meaning the lowest rate.

In summary, the subject system tries to minimize the error rate across the network and forces each of the nodes to check if their transmission is going to cause errors. In order to maximize throughput, each node starts looking to see what their transmission will do to the aggregate throughput across the network. It is important to note that the system will not allow another user to come on if it will interfere with an existing user.

In short, with mobile transceivers at various nodes it is important that each node on the ad-hoc network check system status before transmitting. If the check results in an unacceptable rule violation that cannot be cured, then the transmission is pulled.

Note that the pulling of the transmission is not as disruptive as might be thought since the dynamic situation is reassessed on a microsecond by microsecond basis.

It will be noted that power control and power aware scheduling can be used separately or together. One method to obtain optimal performance is to use power control first and if there is a power control solution then that solution is implemented. If there is no power control solution then one uses power aware scheduling to pull the particular transmission off and reschedule it.

Note that the instantaneous dynamic range measured at the transmitting node is dependent on the number of users and time-varying factors. In the subject invention the instantaneous dynamic range is calculated from receive SNRs at all of the nodes. This instantaneous dynamic range is referred to as SINR, meaning the signal-to-interference plus noise ratio. This is a ratio of received SNR at one node to the sum of the received SNR at all nodes but this one, with the ratio defining the instantaneous dynamic range of the system. This metric is akin to the signal-to-noise ratio except that the denominator is provided with noise power plus interference power, namely how much interference one is getting from other signals. SINR is then compared with the fixed MUD dynamic range to see if the fixed dynamic range has been exceeded.

In summary, what is provided is a system for maintaining acceptable error rates in a MUD-enabled ad-hoc network. In this system the power spread associated with all of the nodes is maintained within the dynamic range of the system, for instance 30 dB. Also, the signal-to-noise ratio at an intended receiver is maintained above a predetermined minimum SNR, for instance above 5 dB. If the dynamic range rule is not met, then the power at the transmitting node is attenuated such that the dynamic range rule is met, checking to see that the minimum SNR rule is also met, or the transmission from this node is pulled. If there is no power control solution, then power aware scheduling is applied. Alternatively, only power aware scheduling is utilized.

BRIEF DESCRIPTION OF THE DRAWINGS

These and other features of the subject invention will be better understood in connection with the Detailed Description, in conjunction with the Drawings, of which:

FIG. 3 is a diagrammatic illustration of a power control scenario in which by attenuating the output from the transceiver at node A by at least 20 dB, the instantaneous dynamic range of a network will not exceed the fixed MUD dynamic range;

FIG. 4 is a diagrammatic illustration of a pathologic situation in which no power optimization solution exists;

FIG. 5 is a diagrammatic illustration of the utilization of power aware scheduling in which if no power control solution exists, transmission from a given transceiver at a given node to another transceiver at another node may be scheduled in a different time slot;

FIG. 6 is a diagrammatic illustration of a power control problem formulation illustrating the first constraint of the instantaneous dynamic range or the negative of SINR being greater than the fixed MUD dynamic range and further that the signal-to-noise ratio for a given link between two nodes must exceed a minimum signal-to-noise ratio, thereby leading to a linear programming approach for either power control of the ad-hoc network;

FIG. 7 is a diagrammatic illustration of a linear programming example in which the two rules or constraints are carried in a matrix used in the linear programming example;

DETAILED DESCRIPTION

Power Control

Figure 1:
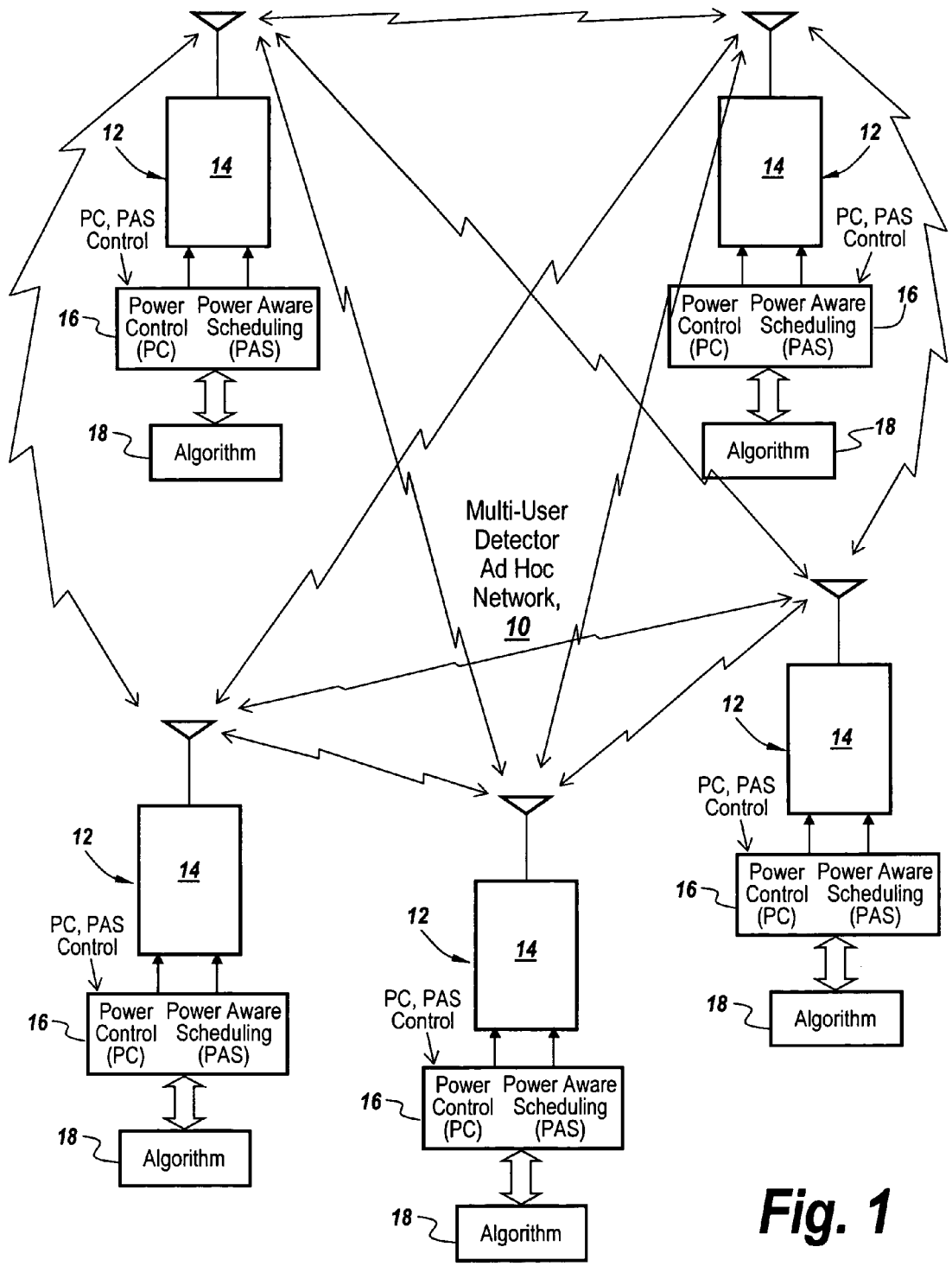
FIG. 1 is a diagrammatic illustration of a multiuser detector ad-hoc network in which individual transceivers at nodes on the network are provided with power control or power aware scheduling in accordance with an associated algorithm to provide error-free packet receipt.

Power control or PC attempts to apply transmitter attenuation to control the power levels seen at each receiver. In a hub and spoke configuration, such as in a cellular network where all nodes transmit to a base station, the base station uses measurements from the handset's transmissions and responds with instructions to the handset to adjust its power level. Since the transmissions from all handsets are destined for the base station, the base station instructs the handsets to adjust their transmit power until they all arrive at the base station at approximately the same power.

In an ad-hoc network, it is impossible to have the transmissions from a node A and a node C arrive at the same power at both receivers, for instance at nodes B and D. In a lot of cases though, the power levels can be controlled at all receivers such that the power spread is within the MUD dynamic range. In certain cases transmit power control can be used to solve the dynamic range coordination problem. In one example, node C can attenuate its transmission in order to stay within the dynamic range of the MUD. There are also situations where power control can not solve the dynamic range coordination problem. In one such case node C needs its higher transmit power in order to reach node E at sufficient SNR and therefore can not attenuate its transmission.

The two main challenges when designing a power control algorithm are to determine if a power control solution is theoretically possible and then to determine how to make decisions to control transmit powers across an ad-hoc network. By formulating the problem in a linear programming construct, both can be jointly solved.

The first constraint of PC for a MUD in an ad-hoc network is typically to remain within a certain SINR or MUD dynamic range. This is shown by the following expressions:

$$SINR = \frac{\alpha_i SNR_{ik}}{\sum_{i \neq j} \alpha_j SNR_{jk} + 1} > \gamma \quad (1)$$

$$\alpha_i SNR_{ik} - \gamma \sum_{i \neq j} \alpha_j SNR_{jk} > \gamma \quad (2)$$

where $\gamma$ is minimum decodable SINR or MUD dynamic range, i is the user of interest for the SINR calculation, $SNR_{ik}$ is the received SNR from user i at user k assuming user i is transmitting at full power, $\alpha_i$ is the gain of user i between 0 and 1. The sum in the denominator of (1) is the sum over all transmitting users besides the user of interest i.

The second constraint of PC is that all transmissions must be above a certain SNR, where $SNR_{min}$ is the minimum decodable SNR.

$$SNR_a > SNR_{min} \quad (3)$$

These constraints can be formulated as a linear programming expressed in (4), where the goal is to minimize the total transmitted power on the network while conforming to the above constraints. The total transmitted power is minimized by minimizing the total transmit gain.

minimize: $c^T \alpha$ subject to: $A\alpha \leq b$ (4)

The c vector is a vector of 1s which attempts to minimize the total transmit power and a is an attenuation vector representing transmit attenuation of each transmitting user. It may be desirable to give different weights to different users in order to prioritize certain users over others based off of who the user is or which radio currently has the lowest battery life.

As an example, suppose that in an ad-hoc network with MUD, there are 3 nodes trying to simultaneously transmit to 3 other nodes. Suppose node 4 wishes to transmit to node 1, node 5 wishes to transmit to node 2 and node 6 wishes to transmit to node 3. We wish to transmit to each at the minimum possible power, while obeying the given constraints. The output of the linear programming problem will be an answer if a power control solution is possible and, if it is possible, it is desired to derive a transmit gain or attenuation vector $\alpha$ for each user that minimizes the total transmit power.

The expression for the above is as follows:
minimize: $[1\ 1\ 1][\alpha_4\ \alpha_5\ \alpha_6]^T$, subject to $$\begin{bmatrix} SNR_{41} & -\gamma SNR_{51} & -\gamma SNR_{61} \\ -\gamma SNR_{42} & SNR_{52} & -\gamma SNR_{62} \\ -\gamma SNR_{43} & -\gamma SNR_{53} & SNR_{63} \\ SNR_{41} & 0 & 0 \\ 0 & SNR_{52} & 0 \\ 0 & 0 & SNR_{63} \end{bmatrix} \begin{bmatrix} \alpha_4 \\ \alpha_5 \\ \alpha_6 \end{bmatrix} \geq \begin{bmatrix} \gamma \\ \gamma \\ \gamma \\ SNR_{min} \\ SNR_{min} \\ SNR_{min} \end{bmatrix} \quad (5)$$

When this equality or inequality is met, the attenuation for each user that satisfy the rules are specified. As a result, certain power levels can be attenuated to maintain the power spread below the fixed MUD dynamic range and so that the received signals are above 5 dB.

A large advantage of formulating the problem in a linear programming construct is that each node can perform the same calculation without a centralized controller. No extra information is needed to coordinate the distributed PC algorithm besides some mechanism for ordering the transmissions. Typically a node ID, MAC address or IP address is readily available that will allow for a sequential ordering of all scheduled transmissions at each node. The received power levels at all nodes as well as the scheduling information do have to be known. This is the optimal power control solution assuming the necessary information is known.

Some MUDs have an additional requirement to guarantee a certain power spread. This requirement would add the extra constraint, and is as follows and is referred to as the third Rule or constraint:

$$\text{For each } i \neq j, \, \alpha_i SNR_{ik} - \alpha_j SNR_{jk} > SNR\_SPREAD, \quad (6)$$

where SNR_SPREAD is the required minimum power spread.

Power Aware Scheduling

Most modern communication systems, whether FDMA, CDMA or OFDMA, work within a TDMA frame structure in order to be able to divide the bandwidth into further portions. This creates another opportunity to solve the MUD dynamic range coordination problem because the multiple simultaneous users who are transmitting on one TDMA slot will likely be different from the ones transmitting on a different TDMA slot. Power Aware Scheduling or PAS attempts to use the TDMA slots to find an opportunity to transmit that will not result in packet errors for any of the transmitting nodes. If one is not available, the best decision is typically to not transmit at all to avoid causing multiple other transmissions to be in error. A simple PAS algorithm can be very effective in avoiding packet errors and hence maximizing throughput. A simple PAS algorithm involves the following steps:

1. A user wishing to transmit will check to see if the SINR and SNR constraints are met for all users, including ones previously transmitting and its own potential transmission, for a certain TDMA slot.
2. If yes, schedule its transmission.
3. If no, look for a different TDMA slot to transmit on.
4. Repeat steps 1-3 until a slot is found or no other slots are available.
5. If no TDMA slot meets the constraints, do not schedule the packet.

After the schedule is made, the SINR and SNR targets must continually be checked because of SNR variations due to mobility to verify that the conditions are still met.

More complex PAS algorithms involve the following improvements:

1. Attention given to higher order modulations/coding. The algorithm only checks to see if the lowest order modulation and coding passes the constraints. An improvement is to also search for a slot where a node can obtain its highest order modulation and coding. The challenge with this approach is that the introduction of the next transmitting user potentially changes which modulation and coding scheme other nodes can use and each may no longer be in the best TDMA slot. A further improvement finds the slot that maximizes network throughput.

2. Attempt to group clusters of high SINR users together and group of low SINR users together. Real world topologies, such as a two group topology, where the users in each group are physically located close to each other, but the two groups are at far distances would benefit from this approach. The users who are communicating within the group would be placed on the same TDMA slot and will all have high SINR. The users who are communicating between the two groups would all use the same TDMA slot and all have low SINR.

More specifically and referring now to FIG. 1, to visualize the subject system a multiuser detector ad-hoc network 10 is shown comprised of a number of nodes 12 having transceivers 14 thereat.

In the multiuser detector ad-hoc network each of the nodes communicates with each of the other nodes as illustrated, with the packet error rate or PER minimized when the signal-to-noise ratios of receive signals at intended receivers are above a certain minimum, in this case 5 dB, and when the instantaneous dynamic range is measured at the transmitting node does not exceed the finite MUD dynamic range, in this case 30 dB.

In order for there not to be interference of one node with another node, and for there to be sufficient signal strength between the nodes to reduce the packet error rate to zero, a power control and power aware scheduling module 16 is coupled to the associated transceiver 14, with the power control and power aware scheduling module being supplied with algorithm 18 that controls the power control and power aware scheduling functions of module 16.

In order for the controller and the algorithms to operate, it is important that information about each of the nodes be available at all of the other nodes. This information is transmitted around the ad-hoc network on a control channel such that each node knows the identity of the other nodes, the scheduling, the signal-to-noise ratio of all the signals received at each of the nodes.

It is the purpose of the power control portion of module 10 to check prior to a transmission that its transmission will not cause packet errors at the intended receiver due either to its power exceeding a power which causes the instantaneous dynamic range of the system to exceed the fixed MUD dynamic range; or that the signal-to-noise ratio at the intended receiver is below the minimum SNR, in this case 5 dB.

If the transmitter output power can be adjusted to both minimize power while at the same time satisfy the above two rules, then error-free packet reception is assured at minimum power. If either of the two rules is violated then the transmission is inhibited until such time as the two rules are satisfied.

Figure 2:
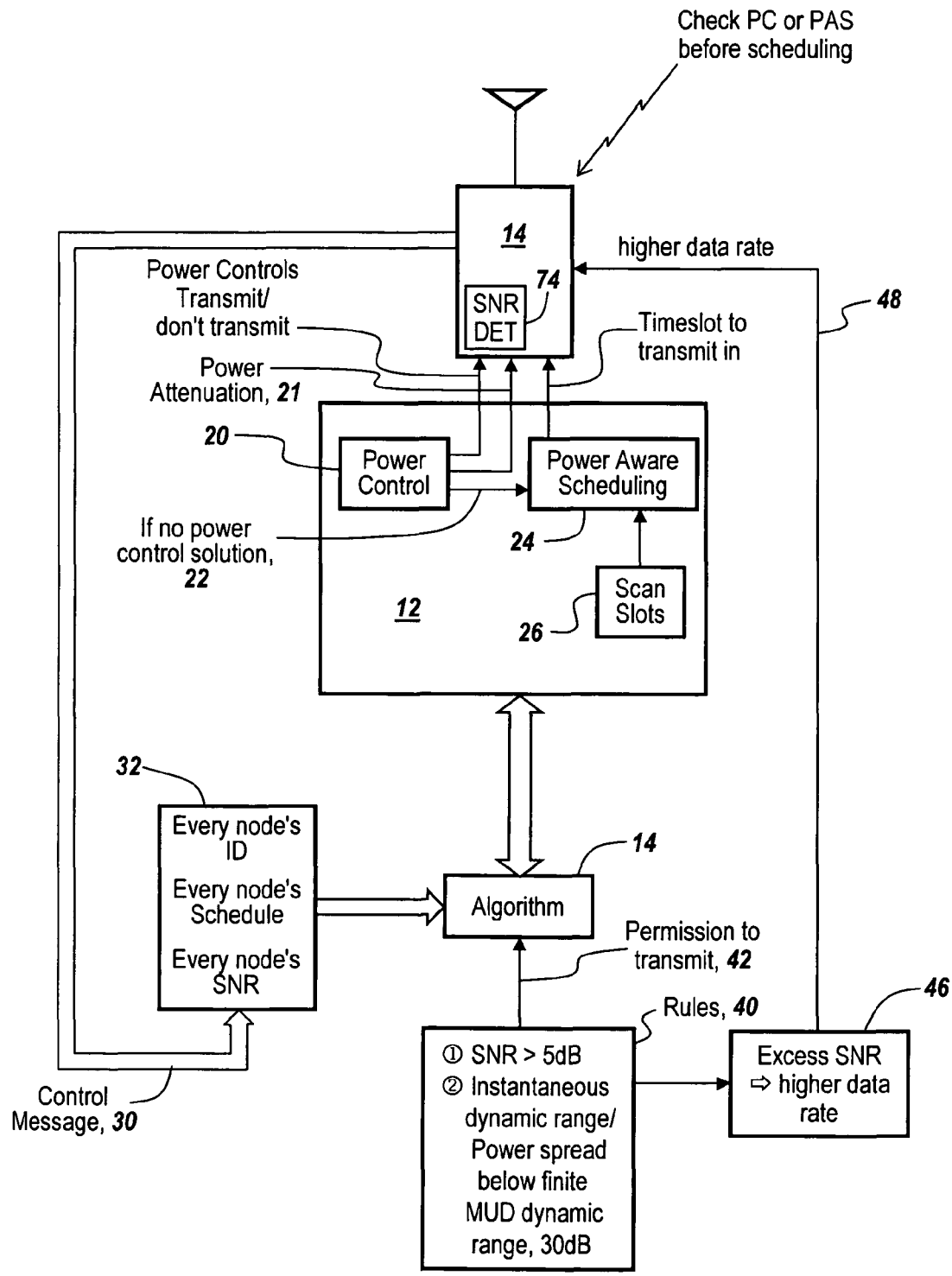
FIG. 2 is a diagrammatic illustration of one of the transceivers at one of the nodes of FIG. 1, illustrating that the power control or power aware scheduling of the module switches from power to control to power aware scheduling if no power control solution exists, also illustrating the detection of excess SNR which leads to a higher data rate transmission.

Referring to FIG. 2, each transceiver 14 is under the control of power control module 20 in module 12, the purpose of which is to adjust the output power of the associated transceiver 14, or to inhibit transmissions as mentioned above.

If there is no power control solution, meaning that either there is not enough power to satisfy the minimum SNR requirement or that the instantaneous dynamic range or power spread, here SINR, is too high, then as illustrated at 22, power aware scheduling is invoked by activating module 24.

It is the purpose of the power aware scheduling module to scan available slots as illustrated at 26 and to provide transmission in an available slot for the particular packet.

In order to accomplish the functions described above, algorithm 18 must be provided with signal-to-noise ratio measurements, the identity of the nodes, and the schedule of the nodes.

In order to provide this information a control message 30 is transmitted around the network where it is received at transceiver 14, and is coupled to storage 32. Storage 32 records each nodes' identification, schedule and signal-to-noise ratios, with the signal-to-noise ratio being determined by a SNR detector 34 at each transceiver. What is provided by storage 32 and the readout thereof are the received signal-to-noise ratios of all of the transceivers at all the nodes on the network, every nodes' ID and every nodes' schedule, from which algorithm 14 can determine whether or not the signal-to-noise ratio at the intended receiver is above 5 dB and whether the instantaneous dynamic range calculated at the transmitting node is below 30 dB, thus in accordance with the rules or constraints 40.

If both rules or constraints have been met, a scheduling signal 42 is coupled to transceiver 12 by module 12. Moreover, by solving the linear equation an attenuation that works for the transmitting node is identified and the associated output power can be appropriately set via a signal over line 21.

It will be noted that the instantaneous dynamic range is computable from all of the signal-to-noise ratios, the equation for which will be discussed in FIG. 6, whereas since receive signal-to-noise ratios for all receivers are available at storage 30, the signal-to-noise ratio of the transmitted signal at the intended receiver is known.

Moreover, since the signal-to-noise ratio for the intended link between a transmitter and a receiver is known, optionally if the signal-to-noise ratio indicates an excess signal-to-noise ratio, this state is recognized by module 46 which couples a command signal over line 48 to transceiver 14 to increase the data rate due to the excess signal-to-noise ratio.

As a result of the above system, since interference between the nodes is minimized, robust packet reception is guaranteed and maximum throughput can be achieved.

Referring now to FIG. 3, what is shown is a number of time slots 50 to accommodate MUD codes 52 for nodes A, B and C of network 54. As depicted, it is desired that a link be established between node A and node B for the transmission of packets from node A to node B and a link is to be established between node C and node B in which packets are to be transmitted from node C to node B. As illustrated, the MUD codes for each of the two links are different, although they need not be. What is important is that each of these transmissions is to be in the same time slot.

Taking that the instantaneous dynamic range requirement is a max 30 dB and further assuming that a max link loss permitted at maximum power is 120 dB, and with the link loss between C and B being 50 dB and the link loss between A and B being 100 dB, then with starting power levels relative to max power, node B will be able to receive transmissions from node C at −50 dB. This is because the link loss between C and B is 50 dB.

If node A transmits at maximum power then node B will receive packets from node A at −100 dB, given that the link loss between A and B is 100 dB.

For node B to receive both signals, namely from node A and node C, and properly apply the MUD algorithm, 50 dB of instantaneous dynamic range is required. However, this exceeds the permitted instantaneous dynamic range of 30 dB.

The solution is to attenuate the power generated by the transceiver at node A by at least 20 dB such that the instantaneous dynamic range or power spread is 30 dB or below.

It will be appreciated that the instantaneous dynamic range for the A, B, C scenario is 100 dB minus 50 dB, or 50 dB. Since the system can only accommodate 30 dB instantaneous dynamic range, it is possible to attenuate the transmissions from A by at least 20 dB and still have its transmissions received with an SNR above 5 dB.

Referring now to FIG. 4, a situation is depicted in which there is no possible power control solution. In this case, the transmission from network 60 results in transmissions between node A to node B and node C to node D in the same time slot. Here again, the instantaneous dynamic range is 30 dB max, and the max link loss permitted at max power is 120 dB max. Note, the link loss between node C and D is 110 dB, the link loss between node C and node B is 50 dB and the link loss between node A and node B is 100 dB.

Assuming that all power levels are relative to max power, then node C must transmit at at least −10 dB to close the link with node D. This is calculated by subtracting the link loss of 110 dB between node C and node D from the max link loss permitted at max power of 120 dB.

As before, node B will receive node C at −50 dB.

However, if A transmits at max power, node B will receive node A at −100 dB. For node B to receive both signals and properly apply MUD algorithms, the system needs 50 dB of instantaneous dynamic range. However, system design permits only 30 dB of dynamic range. Here there is no attenuation that can be applied to reduce the instantaneous dynamic range to 30 dB because the SNR constraint will not be met.

Focusing on receiver B that wants to receive the signal from node A, there will be interference coming from node C unless C can reduce power. However, reducing the power from C will prevent the link from C to D from closing.

In this case one cannot attenuate the transmit power from C and still allow node A to be received at node B.

Referring now to FIG. 5, the pathological situation of FIG. 4 can be cured as illustrated by having node C linked to node D in a different time slot such that with respect to time slots 50, the transmission from node A to node B is in one time slot 50', whereas the transmission from node C to node D is in a different time slot 50". With all of the other assumptions of FIG. 4 in place, it can be seen that A transmits to B at −20 dB to close the link. There is no interference from node C since node C is not transmitting in that time slot. Note node C transmitting at −10 dB can close the link with node D without interfering with the AB link. Thus, shifting time slots when the two rules are not met results in a system in which interference is minimized across the network.

Referring now to FIG. 6, there are two constraints or rules that must be met. These constraints can be characterized as a linear programming problem, with the two constraints being shown at 62. Here the Constraint 1 is that the instantaneous dynamic range must be greater than $\gamma$, the fixed MUD dynamic range. Here it will be seen that the signal-to-noise ratio for a given link between node i and node k is on the numerator, whereas the denominator is the sum of all signal-to-noise ratios not involved in the ik link. This expression is denoted as SINR, with the instantaneous dynamic range or SINR involving signal interference noise levels. Note that SINR thus correlates with the minimum decodable interference suppression limit.

Here the second expression is merely a rearrangement of the first expression such that an instantaneous SINR or instantaneous dynamic range is easily calculatable.

Note $SNR_{ik}$ is the receive power from user i at user k at 0 dB transmit attenuation, where $\alpha_i$ is the attenuation of user i and where $\gamma$ is the minimum decodable SINR.

It is noted that the Constraint 1 and Constraint 2 are easily handled by linear programming as illustrated at 64, involving attenuations, $\alpha$.

It is noted that SINR can be calculated from the signal-to-noise ratios such that SINR takes into account the interference from others. When one does the calculation illustrated in FIG. 4, for instance when one is looking at node B, one is subtracting out one user's power from the others. When one does this one actually performs an SINR calculation. Thus, what is calculated is the amount of signal-to-interference that one is actually seeing at a node and this amount of signal-to-interference is readily calculatable by the subtraction shown at 62. It is noted that the minimum decodable SINR means the dynamic range that a MUD receiver can support.

Referring now to FIG. 7, what is illustrated is a linear programming example for these links, namely 4-1, 5-2, 6-3.

It is noted that the alphas $\alpha_4$ $\alpha_5$ $\alpha_6$ are the transmit attenuations of each user. The SNR is the receive power from one user to another and the $\gamma$ is the minimum decodable dynamic range or SINR, i.e. the fixed MUD dynamic range.

Note that the matrix to the left which includes $SNR_{41}$, $-\gamma SNR_{51}$, $-\gamma SNR_{61}$ for link 4-1, $-\gamma SNR_{42}$, $\gamma SNR_{52}$, and $-\gamma SNR_{62}$ for link 5-2, and $-\gamma SNR_{43}$, $-\gamma SNR_{53}$ and $SNR_{63}$ for link 6-3 instantiates Constraint 1. $SNR_{41}$, 0, 0 for link 4-1; 0, $SNR_{52}$, 0 for link 5-2; and 0, 0, $SNR_{63}$ for link 6-3 instantiates Constraint 2. Note that this matrix is multiplied by vector attenuations such that this entity must be greater than or equal to a vector reflecting the finite MUD dynamic range and the minimum SNR requirement. When the equation inequality of FIG. 7 is met it means that there is at least one attenuation, $\alpha$, solution that will satisfy all the constraints.

The expression at the top of the linear programming example is meant to signify to the attenuations that will minimize transmit power. One reason for this is to save battery life. Also the 1, 1, 1 vector can be changed to effectuate various weightings.

Figure 8:
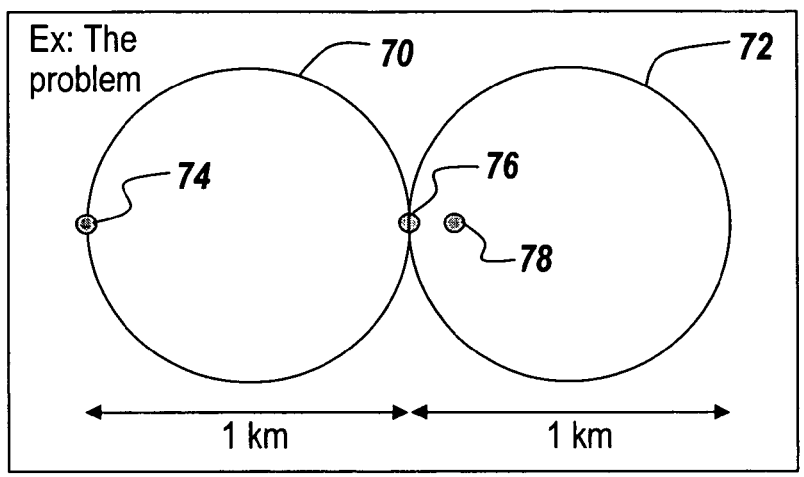
FIG. 8 is a diagrammatic illustration of a power aware scheduling scenario which sets up the problem of a far node not being received by another node in an adjacent coverage area in which while the node in the adjacent coverage area cannot receive transmission from the far node, packet receipt is nonetheless impaired.

Referring now to FIG. 8, what is shown is a power aware scheduling problem where one has to adjust the transmission schedule so that all the packets are decoded without error. Here it is noted that there are two contiguous range rings, namely the range indicated by ring 70 and the range indicated by ring 72. Each ring specifies that there is a maximum transmission distance of 1 kilometer in each case. As illustrated, there is a node 74 all the way to the left that is transmitting to a node 76 at the intersection of rings 70 and 72. The transceiver at node 76 can barely hear the transmission from node 74, whereas a node 78 located to the right of node 76 just barely cannot hear the transmission from node 74. However, the transmission from the transmitter at node 74 can interfere with receipt of signals at node 78. Thus, while node 78 is not supposed to be the intended receiver for signals from node 74, if node 74 is transmitting there will be some effect on node 78 even though node 78 is outside of the region designated by ring 70. While node 78 might be able to decode packets from node 74, there is no guarantee of proper receipt of the packets because the signal-to-noise ratio minimums have not been met. Just because one is receiving a node below the minimum signal-to-noise ratio does not mean that this node is unaffected by interference.

By way of example, if for instance one has two groups of people, with one Group A having two people who are close to each other and another Group B having two people who are close together and far away from the first group, if for instance one person in Group A is talking to one person in Group B, and the other person in Group B is talking to the other person in Group A, one has two conversations that are going on across and between the two groups. Since one group is far away from another group, if one is using two user multiuser detection, one wants to be able to receive the person who is far away and this person is going to be at some low signal-to-noise ratio because he is further away. One would ordinarily see interference from the other user trying to send his data because this user is close. This user may be 40 dB higher than the user that one is trying to decode. Since this power spread is outside the finite MUD dynamic range, the MUD system is incapable of ignoring the interference from the other user.

Figure 9:
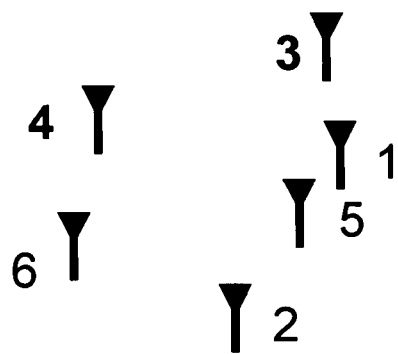
FIG. 9 is a diagrammatic illustration of a node laydown in which a link between nodes 5 and 2 is permitted in a different time slot than the other links in the network.

Referring to FIG. 9, with power aware scheduling the situation depicted in FIG. 8 can be solved. If for instance node 78 is receiving in a different time slot than node 74 is transmitting on, then the interference becomes moot.

By dividing up time slots as illustrated by time slots 76, one supports transmissions of for instance node 5 to node 2, whereas if they were transmitted in the same time slots such as the 4-1 transmissions or the 6-3 transmissions, it would be impossible for node 2 to receive packets from node 5.

Note that the goal in every MUD-enabled ad-hoc system is that every node who is supposed to be receiving can simultaneously receive from every other node. From the illustration in FIG. 9, node 2 could not receive packets from node 5, because in illustrative embodiment the transmissions would violate the above-mentioned rules. If the rules are satisfied for both the node 6 to node 3 link and the node 5 to 2 node link, then error-free receipt of packets is assured. On the other hand, if the node 5 to node 2 link would result in a violation of Rules 1 and 2 for either of the other time slots illustrated, then the node 5 to node 2 transmission would be inhibited.

Figure 10:
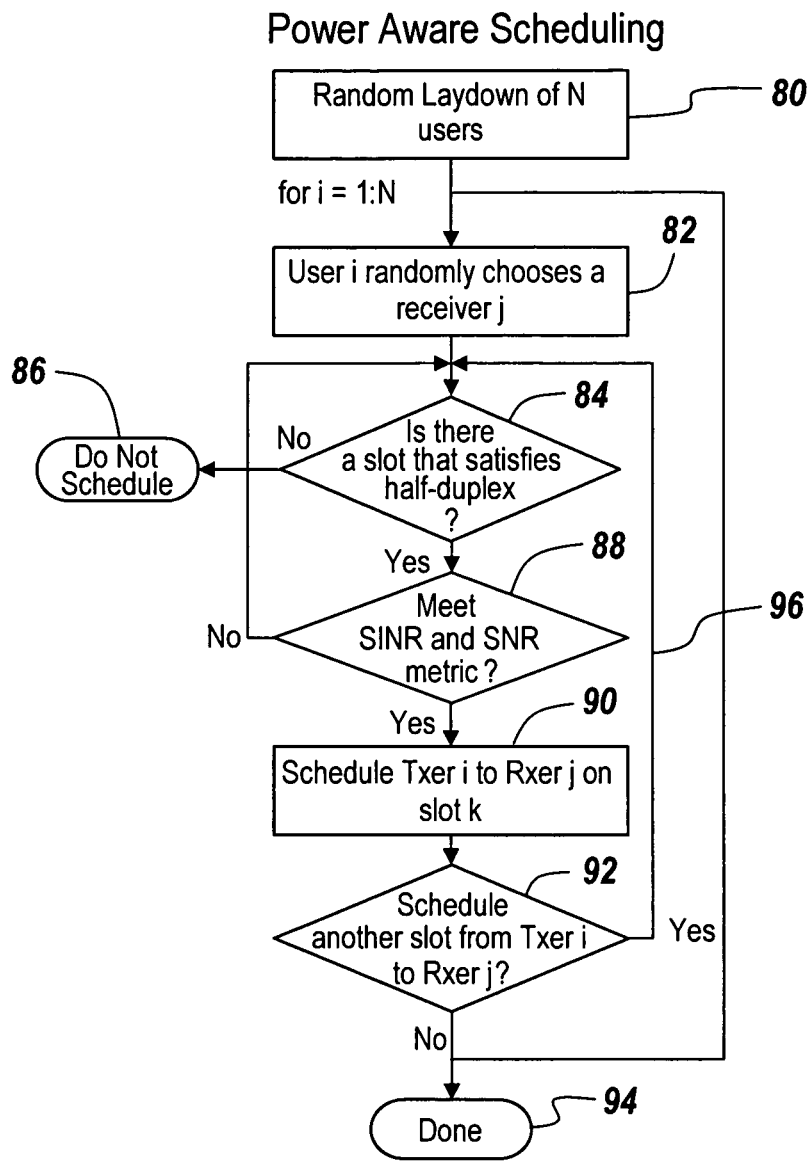
FIG. 10 is a flow chart showing a power aware scheduling process in which random laydown of N users for a given user who randomly chooses another receiver the question is asked is there a slot that satisfies a half duplex solution, and if so whether or not the SNR and SINR rules are met, thus to permit the transmission of the data.

Referring to FIG. 10, what is shown is a flow chart for power aware scheduling in which a random laydown of users is illustrated at 80. For cycling from the first user to the nth user, as illustrated at 82 user i randomly chooses a receiver j.

As illustrated at 84, one ascertains if there is a slot that satisfies the half duplex rule.

The Half Duplex Rule is as Follows:

If a given transmitter is attempting to find a slot to transmit to a certain receiver, it must be a slot where: 1) it is not currently transmitting 2) it is not currently receiving and 3) the intended receiver is not currently transmitting.

If there is no half duplex solution, then the transmission is not scheduled as seen at 86. If there is a slot available for half duplex transmissions, then the question is whether the proposed transmission from user i to receiver j is permitted. This question is posed at 88 as to whether the proposed transmission meets both the SINR and SNR metrics, meaning the instantaneous dynamic range requirement and the minimum signal-to-noise ratio requirement. If both SINR and SNR constraints have been met, then as illustrated at 90 transmitter i is scheduled to transmit to receiver j on slot k. If for instance, as illustrated at 92, there is no necessity to find another slot from transmitter i to receiver j, as would be the case if there was sufficient bandwidth in slot k, then the transmission from transmitter i to receiver j is permitted as illustrated at 94. On the other hand, if the bandwidth requirements for slot k are not sufficient, then one picks another slot as illustrated by line 96 and loop back through the process again.

When one has a randomly chosen slot, the first question that the above solves is whether or not there is an open slot that does not violate the half duplex rule. Note that the half duplex rule basically says that one cannot receive when one is transmitting and this is basically a scheduling question.

Figure 11:
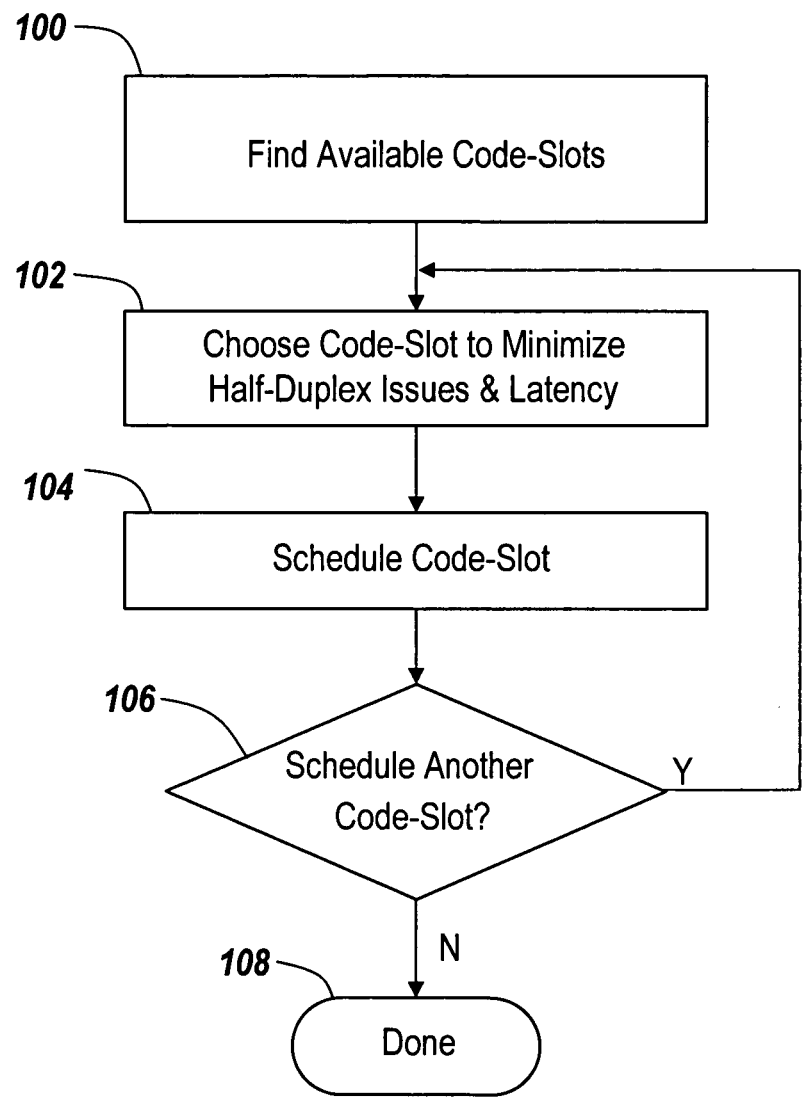
FIG. 11 is a flow chart illustrating the process for finding available code slots.

Referring to FIG. 11, from a general overview in terms of slot scheduling, as illustrated at 100 one first finds available code slots and then as illustrated at 102 one chooses a code slot to minimize half duplex issues and latency.

As illustrated at 104 one then schedules a particular code slot, whereas as illustrated at 106 one asks whether there is another code slot that needs to be scheduled. If not, then the scheduled code slot is utilized as illustrated at 108.

Figure 12:
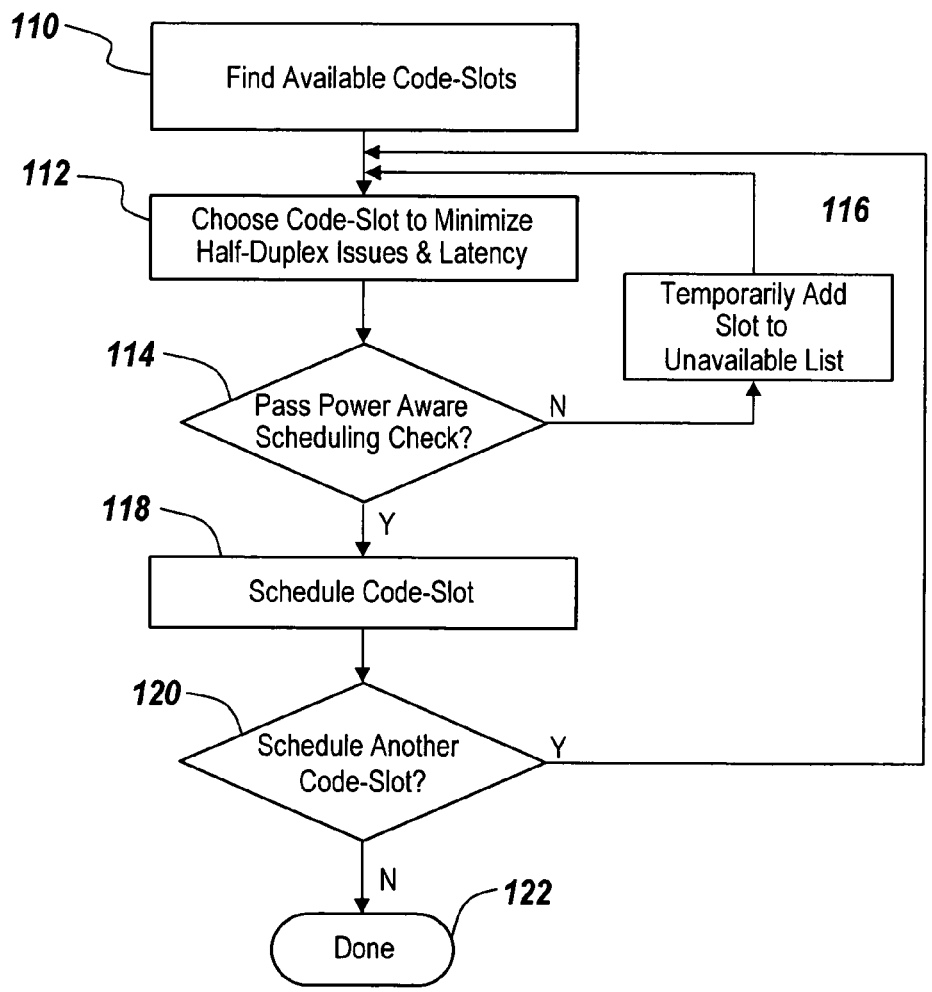
FIG. 12 is a flow chart for basic power aware scheduling in which the power aware scheduling check is done using a QPSK metric; and, FIG. 13 is a flow chart in which if there are no available 16QAM code slots, the system checks as to whether QPSK power aware scheduling is possible.

Referring to FIG. 12, what is shown is the basic power aware scheduling MAC. A power aware scheduling check is done using the QPSK metric. When a packet is about to be transmitted it is tested against the 16QAM metric to see if it can obtain the higher rate associated with 16QAM transmissions. If not QPSK is used.

Note that it is important to check the current slot to see if the power aware scheduling rules are violated. If not, one can move off of the current slot.

As shown in FIG. 12 one first finds the available code slots as illustrated at 110, chooses the code slot to minimize half duplex issues and latency as illustrated at 112, and then one checks to see whether one passes the power aware scheduling rules as illustrated at 114. If not, as illustrated at 116, one temporarily adds the current slot to the unavailable list. If the power aware scheduling check is passed, then the current code slot is scheduled as illustrated at 118. If no other code slot is required as illustrated at 120, then the packets are transmitted as illustrated at 122.

Figure 13:
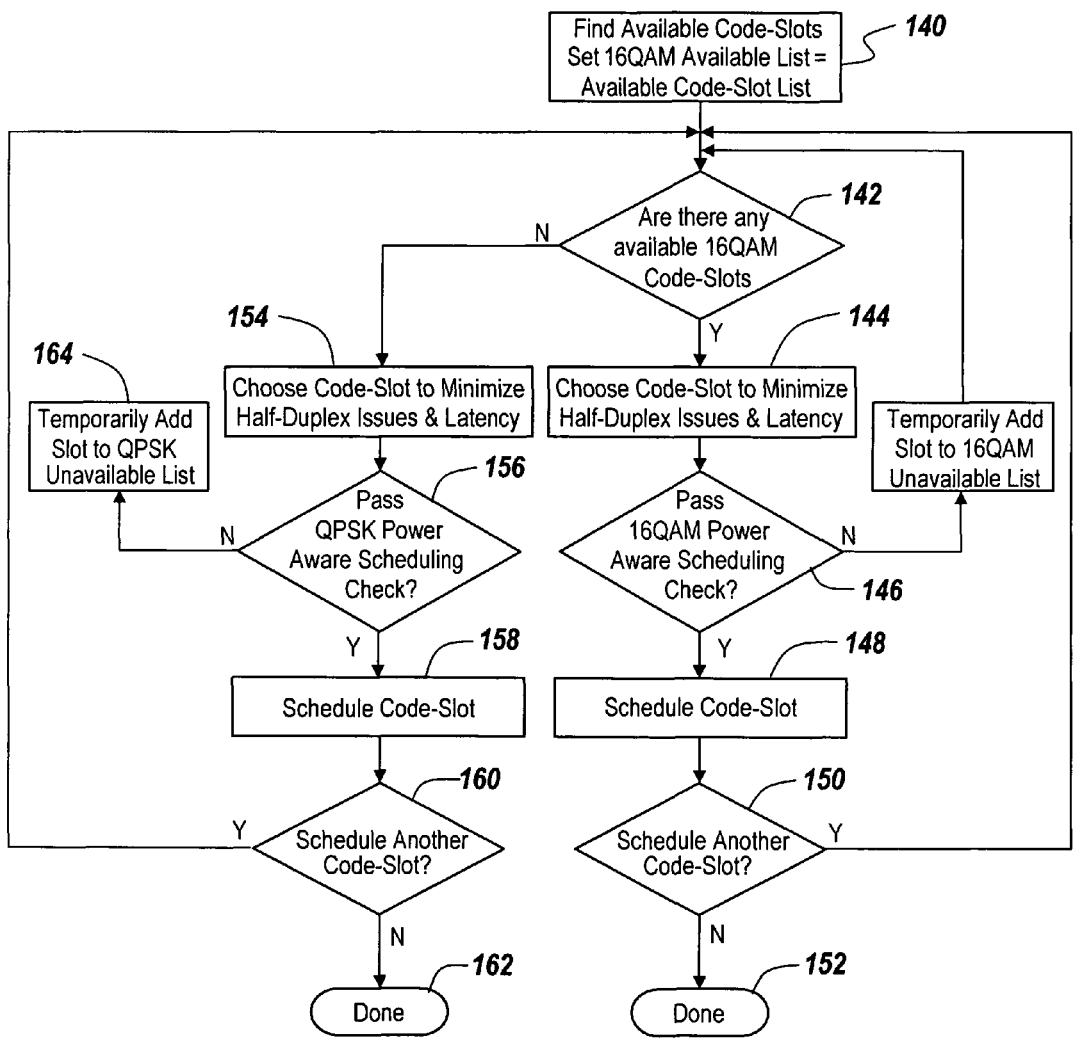

Referring now to FIG. 13, a 16QAM power aware scheduling MAC scenario is depicted. It is noted that a user will always try to schedule in slots where 16QAM transmissions are allowed. However, a next person coming into the slot may disrupt the first user and it may be required that the second user switch to QPSK in order not to interfere with the first user.

Here it can be seen from the flow chart as illustrated at 140 and 142 for the second user one finds if there are any available 16QAM code slots and sets the 16QAM available list equal to the available 16QAM code slot list. Note, as illustrated at 142, it is ascertained if there are any available 16QAM code slots and if the answer is yes then the code slot to minimize half duplex issues and latency is chosen as illustrated at 144. Again, a query is made at 146 as to whether or not 16QAM power aware scheduling has been passed, and if so, this code slot is scheduled at 148 pending the resolution of the requirement for another code slot at 150. If there is no necessity for another code slot, then the packets are transmitted using 16QAM illustrated at 152. If there is the requirement for another code slot this loops back as illustrated.

On the other hand, if there are no available 16QAM code slots, one shifts to QPSK. One still has to choose a QPSK code slot to minimize half duplex issues and latency as illustrated at 154, with the resultant output having to pass a QSPK power aware scheduling check as illustrated at 156. If there is a QPSK affirmative result, then a QPSK code slot is scheduled at 158. If there is no other code slot required as illustrated at 160 then this portion of the scheduling is completed as illustrated at 162.

If another code slot is required then again there is a loop back as illustrated. Note that if there is a check for QPSK power aware scheduling that does not pass, then one temporarily adds the slot involved to the QPSK unavailable list as illustrated at 164.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In an ad-hoc node of a multiuser detector enabled ad-hoc network, a system for reducing packet error rate, comprising:
a control module configured to control a power of a signal transmitted from an associated transceiver such that, as a constraint on the transmission of data packets from said associated transceiver in a code slot, the power of the transmitted signal is changed based on whether:
a finite multiuser detection (MUD) dynamic range is exceeded by an instantaneous dynamic range as calculated at said associated transceiver from signal-to-noise ratios (SNRs) of other ad-hoc nodes of the multiuser detector enabled ad-hoc network, and
a signal-to-noise ratio of signals transmitted by said associated transceiver to an intended receiver on a multiuser detector enabled ad-hoc network is below a predetermined signal-to-noise ratio;
wherein the ad-hoc node is not an acting controller of the multiuser detector enabled ad-hoc network.

2. The system of claim 1, including a further constraint that the instantaneous dynamic range must be greater than some predetermined number.

3. The system of claim 1, wherein said control module is configured to attenuate the output power of the associated transceiver until the constraint is met, thereby limiting a transmit power used by nodes in said ad-hoc network.

4. The system of claim 1, wherein said control module is configured to use a linear algorithm for determining a transmit power of the signal transmitted from the associated transceiver.

5. The system of claim 4, wherein the linear algorithm determines a transmit power of the signal transmitted from the associated transceiver based on information relative to an identification, scheduling, and received signal-to-noise ratios of nodes in said ad-hoc network.

6. The system of claim 5, wherein the linear algorithm determines a transmit power of the signal transmitted from the associated transceiver based on a received control message including the identification, scheduling, and received signal-to-noise ratios of nodes in said ad-hoc network.

7. The system of claim 1, comprising a signal-to-noise ratio detector that detects the signal-to-noise ratio of signals that are received by the associated transceiver.

8. The system of claim 1, including a power aware scheduling program, said power aware scheduling program scheduling transmission of a packet in a slot other than a current slot.

9. The system of claim 1, wherein said constraint on the transmission of data packets from said transceiver in a code slot includes a constraint on said instantaneous dynamic range that takes a form of $$\frac{\alpha_i SNR_{ik}}{\sum_{i \neq j} \alpha_j SNR_{jk} + 1} > \gamma$$

and a constraint on said predetermined signal-to-noise ratio that takes a form of $SNR_{ik} > SNR_{min}$.

10. The system of claim 1, including a module configured to detect excess signal-to-noise ratio at a receive node and causes the associated transceiver to transmit at a higher data rate.

11. The system of claim 1, wherein the control module is configured to, prior to the associated transceiver transmitting a packet of data, check for compliance with said constraint on the transmission of data packets from said transceiver in a code slot, including a constraint on said dynamic range and a constraint on said predetermined signal-to-noise ratio.

12. The system of claim 11, wherein if neither constraint is met an associated packet is not scheduled for transmission.

13. The system of claim 12, wherein the control module is configured to determine an attenuation for the signal to be transmitted from the associated transceiver so as to meet said dynamic range constraint and said predetermined signal-to-noise ratio constraint.

14. The system of claim 13, wherein if there is no possible attenuation that meets said dynamic range constraint and said signal-to-noise ratio constraint, said control module is configured to scan for a different slot for transmitting the current packet, and if the transmission in said different slot meets said dynamic range constraint and said predetermined signal-to-noise ratio constraint, the associated packet is transmitted.

15. The system of claim 14, wherein said control module is configured to find available code slots and choose a code slot to minimize half duplex issues, and further schedule the chosen code slot for transmission of a current packet.

16. The system of claim 15, wherein another code slot is required if the bandwidth of the chosen code slot is insufficient to transmit the current packet.

17. The system of claim 15, wherein said control module is configured to perform a power aware scheduling check on said chosen code slot.

18. The system of claim 1, wherein packets to be transmitted are initially to be transmitted using a high data rate and wherein said control module is configured to first determine if there are any available high data rate code slots and if so, choose an available high data rate code slot that minimizes half duplex issues followed by a high data rate power aware scheduling check prior to scheduling packets utilizing the high data rate protocol.

19. The system of claim 18, wherein said control module is configured to, if there are no available high data rate code slots, choose a lower data rate code slot that minimizes half duplex issues and checks to see if the chosen code lower data rate slot passes a lower data rate power aware scheduling check, the passage of the lower data rate power aware scheduling check resulting in scheduling of said packet utilizing the lower data rate protocol.

20. A method for reducing packet error rate in an ad-hoc node of a multiuser detector enabled ad-hoc network, comprising:
   determining if a signal-to-noise ratio of signals transmitted by a transceiver to an intended receiver on a multiuser detector enabled ad-hoc network is below a predetermined signal-to-noise ratio;
   determining an instantaneous dynamic range at the transceiver;
   determining a finite MUD dynamic range at the transceiver; and
   controlling a power of a signal transmitted from the transceiver such that, as a constraint on the transmission of data packets from said transceiver in a code slot, the power of the transmitted signal is changed based on whether:
      the determined finite MUD dynamic range is exceeded by the determined instantaneous dynamic range as calculated at said transmitting transceiver from SNRs of other ad-hoc nodes of the multiuser detector enabled ad-hoc network, and
      the determined signal-to-noise ratio of signals transmitted by said transceiver to an intended receiver on a multiuser detector enabled ad-hoc network is below a predetermined signal-to-noise ratio;
   wherein the ad-hoc node is not an acting controller of the multiuser detector enabled ad-hoc network.

21. A non-transitory computer readable medium storing a computer program, executable by a machine, for reducing packet error rate in an ad-hoc node of a multiuser detector enabled ad-hoc network, the computer program comprising executable instructions for:
   determining if a signal-to-noise ratio of signals transmitted by a transceiver to an intended receiver on a multiuser detector enabled ad-hoc network is below a predetermined signal-to-noise ratio;
   determining an instantaneous dynamic range at the transceiver;
   determining a finite MUD dynamic range at the transceiver; and
   controlling a power of a signal transmitted from the transceiver such that, as a constraint on the transmission of data packets from said transceiver in a code slot, the power of the transmitted signal is changed based on whether:
      the determined finite MUD dynamic range is exceeded by the determined instantaneous dynamic range as calculated at said transmitting transceiver from SNRs of other ad-hoc nodes of the multiuser detector enabled ad-hoc network, and
      the determined signal-to-noise ratio of signals transmitted by said transceiver to an intended receiver on a multiuser detector enabled ad-hoc network is below a predetermined signal-to-noise ratio;
   wherein the ad-hoc node is not an acting controller of the multiuser detector enabled ad-hoc network.

* * * * *